G. W. BOYNTON.
APRON FOR AUTOMOBILES.
APPLICATION FILED MAR. 24, 1920.
1,374,353.
Patented Apr. 12, 1921.
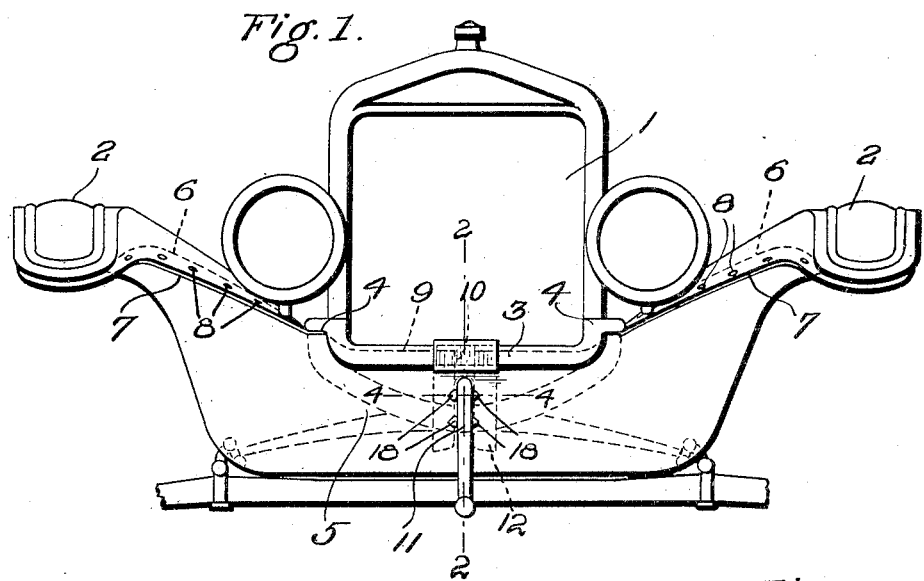
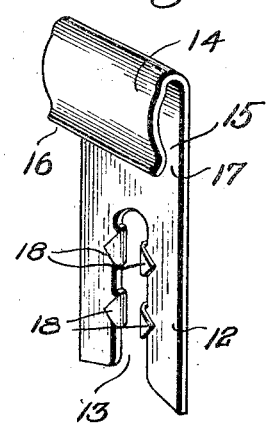
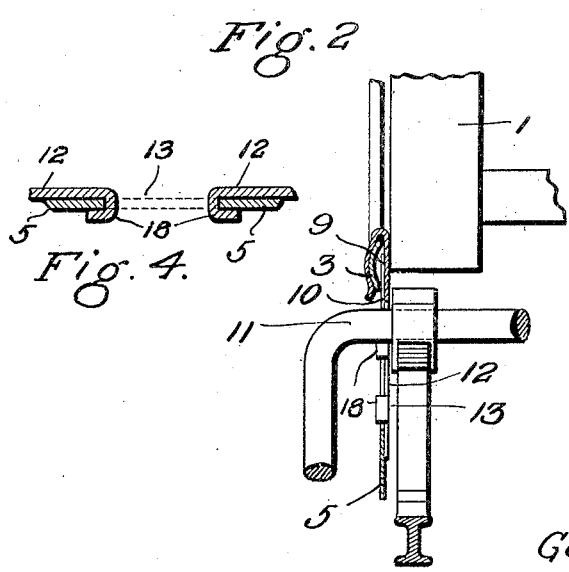
Inventor
George W. Boynton,
by Heard Smith & Tennant
Atty's.

UNITED STATES PATENT OFFICE.

GEORGE W. BOYNTON, OF WATERTOWN, MASSACHUSETTS.

APRON FOR AUTOMOBILES.

1,374,353.     Specification of Letters Patent.     Patented Apr. 12, 1921.

Application filed March 24, 1920. Serial No. 368,370.

*To all whom it may concern:*

Be it known that I, GEORGE W. BOYNTON, a citizen of the United States, residing at Watertown, county of Middlesex, State of Massachusetts, have invented an Improvement in Aprons for Automobiles, of which the following description, in connection with the accompanying drawing, is a specification, like characters on the drawing representing like parts.

This invention relates to aprons for automobiles such as are used to provide finish at the front of the automobile beneath the radiator and between the front fenders, and the object of the invention is to provide a novel construction by which the apron is snugly held at its central portion and prevented from rattling or becoming loose.

In order to give an understanding of my invention, I have illustrated in the drawing a selected embodiment thereof which will now be described, after which the novel features will be pointed out in the appended claims.

In the drawings Figure 1 is a front view of an automobile having my improvements applied thereto;

Fig. 2 is a section on the line 2—2, Fig. 1;

Fig. 3 is a perspective view of the retaining member by which the central portion of the apron is firmly held in place.

Fig. 4 is an enlarged section on the line 4—4, Fig. 1.

In the drawings I have indicated at 1 the radiator of an automobile and at 2 the front fenders. This radiator usually has associated therewith a finish strip 3 which is located at the lower edge of the radiator and which provides a finish for such lower edge. This finish strip 3 is frequently secured at its ends 4 to the chassis or to the radiator or some other fixed part, but the central part thereof is loose and is separated from the radiator.

5 represents an apron which extends from one fender 2 to the other and is shaped at its upper outer edges 6 to fit the edges 7 of the fender, the edges 6 and 7 being riveted together by suitable rivets 8. The central portion of the apron depends below the radiator 1, and the upper edge 9 of said central portion is confined between the finish strip 3 and the bottom of the radiator. The apron is provided with a slot 10 extending from the upper edge in which the starting crank 11 is received. The slot 10 permits the apron to be applied to the automobile after the starting crank is in place.

The central portion of the apron is not secured to the radiator but is loosely received between the latter and the finish strip 3. As a result, the vibration of the automobile is apt to set the upper edge 9 of the apron and the finish strip 3 vibrating, thus causing an annoying rattle. I have provided a simple means for supporting the apron at its central portion and holding the same tightly against the finish strip so as to prevent this rattle or noise. I accomplish this by means of a retaining member, such as shown in Fig. 3, and which is in the form of a piece of sheet metal 12 having a crank-receiving slot 13 extending upwardly from its lower edge and having its upper edge bent over, as shown at 14. Said bent-over portion 14 may conveniently be formed with a shape to fit the contour of the finish strip 3. This retaining member is also formed with ears or lips 18 at each edge of the slot 13, said lips being adapted to embrace the edges of the slot 10 in the apron 5. The retaining member is preferably made of resilient metal and has such a shape that the space 17 between the portion 15 thereof and the body is slightly less than the combined thickness of the apron and the finish strip 3. When the retaining member is inserted into position the body portion 12 thereof will be inserted behind the finish strip 3 and behind the apron 5, and as the retaining member is forced into position, the lips 18 will engage the edges of the slot 10 of the apron, thus holding the retaining member firmly in contact with the apron. When the retaining member is fully in position the bent-over portion 14 will embrace the upper edge of the apron and the finish strip 3, and since the space 17 is normally slightly less than the combined thickness of the finish strip and apron, the retaining member will serve to hold the apron and finish strip firmly together and will prevent any undesirable rattling noise. The lips 18 also prevent any loose play between the retaining member and the apron. The slot 13 receives the starting crank 11, as will be obvious.

My device is simple to manufacture and it eliminates entirely any undesirable rattling noise due to the use of an apron such as herein shown which is secured at its ends only and is loosely held at its central portion between the finish strip and the radiator.

While I have illustrated herein a selected embodiment of my invention, I do not wish to be limited to the constructional features shown.

I claim:

1. In an automobile, the combination with a radiator having a finish strip at its lower edge disconnected therefrom, of an apron having its upper edge loosely retained between the finish strip and radiator, and a retaining member adapted to be inserted between the radiator and apron and having a U-shaped resilient portion to embrace the upper edge of said apron and said finish strip and hold them in firm contact.

2. In an automobile, the combination with a radiator having a finish strip at its lower edge disconnected therefrom, of an apron having its upper edge loosely retained between the finish strip and radiator, and a retaining member of sheet metal having a body portion adapted to be inserted between the apron and the lower end of the radiator and provided with a slot for the starting crank, the upper portion of said body being bent over the finish strip and upper end of the apron and yieldingly holding them in firm contact.

3. In an automobile having fenders, the combination with a radiator having a finish strip at its lower edge disconnected therefrom, of an apron connected to said fenders and having its upper edge loosely retained between the finish strip and the radiator, said apron having a slot to receive the starting crank, and a retaining member of sheet metal having a body portion adapted to be inserted between the apron and the lower end of the radiator and provided with a slot for the starting crank, the upper portion of said body being bent over the finish strip and the upper end of the apron and yieldingly holding them in firm contact, said body portion having lips to embrace the edges of the slot in the apron.

In testimony whereof, I have signed my name to this specification.

GEORGE W. BOYNTON.